United States Patent [19]

Fox

[11] 4,261,621
[45] Apr. 14, 1981

[54] DUAL WHEEL ADAPTER KIT

[76] Inventor: Floy Fox, Rte. 2, Box 60, Haskell, Okla. 74436

[21] Appl. No.: 69,722

[22] Filed: Aug. 27, 1979

[51] Int. Cl.³ .............................................. B60B 11/00
[52] U.S. Cl. .............................. 301/36 R; 301/9 DN
[58] Field of Search ............... 301/13 SM, 13 R, 36 R, 301/36 A, 36 WP, 38 R, 39 S, 40 S, 9 DN; 152/376

[56] References Cited

U.S. PATENT DOCUMENTS

| | | | |
|---|---|---|---|
| 1,606,077 | 11/1926 | Johnson | 301/38 R |
| 1,738,682 | 12/1929 | Baker | 301/36 R |
| 1,810,195 | 6/1931 | Wharam | 301/36 R |
| 2,416,862 | 3/1947 | Baker | 301/36 R |
| 2,635,012 | 4/1953 | Rappaport | 301/36 R |
| 3,664,709 | 5/1972 | Barr'e | 301/36 R |

*Primary Examiner*—H. Grant Skaggs
*Attorney, Agent, or Firm*—Head & Johnson

[57] ABSTRACT

An adapter kit for changing a single wheel mounting on a vehicle to a dual wheel mounting and comprising a sleeve adapted to be positioned against the outer surface of the single wheel in substantial axial alignment with the wheel axle and extending outwardly from the wheel, a flanged plate member secured to the outer end of the sleeve and having a plurality of circumferentially spaced apertures provided therein, a plurality of longitudinally extending tube members rigidly secured to the wall of the sleeve with a tube member being disposed in alignment with each of the apertures of the flanged plate for receiving a threaded stem therethrough, nut members interposed between each tube and the usual lugs bolts of the single wheel for securing a threaded stem to each lug bolt, an abutment provided on the opposite faces of the flanged disc whereby one abutment engages the inner periphery of the sleeve and the opposite abutment engages the inner periphery of the sleeve and the opposite abutment receives the central of a second wheel thereagainst, and lug nuts removably secured to the outer ends of the threaded stems outboard of the second wheel for securing the wheel to the flanged plate and axle of the vehicle.

5 Claims, 6 Drawing Figures

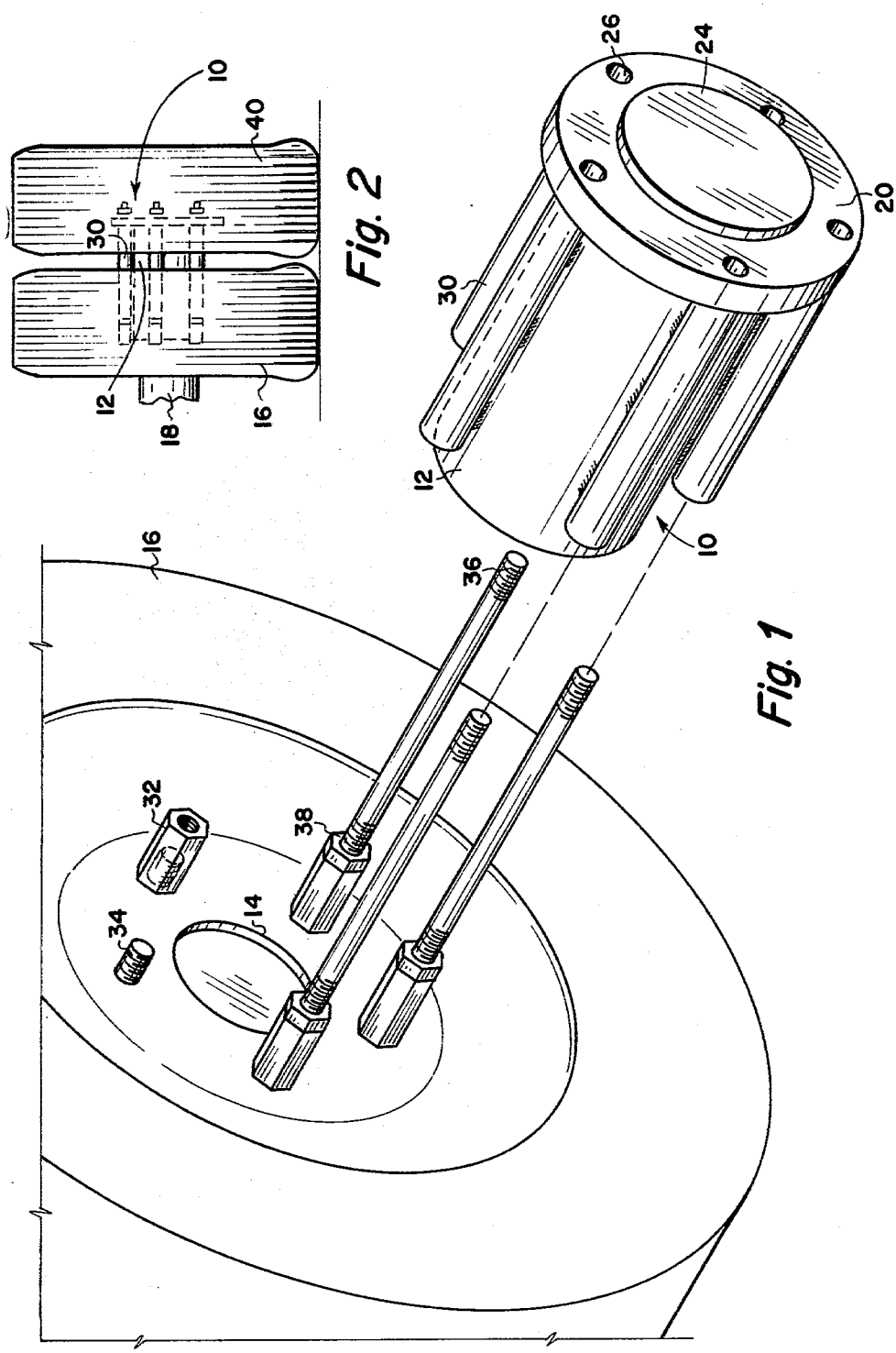

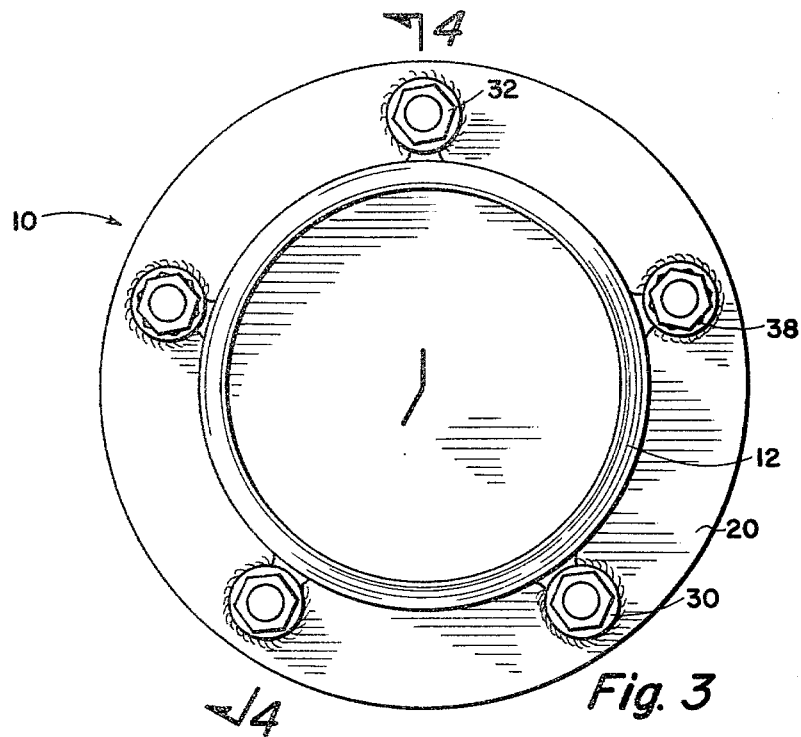
Fig. 3
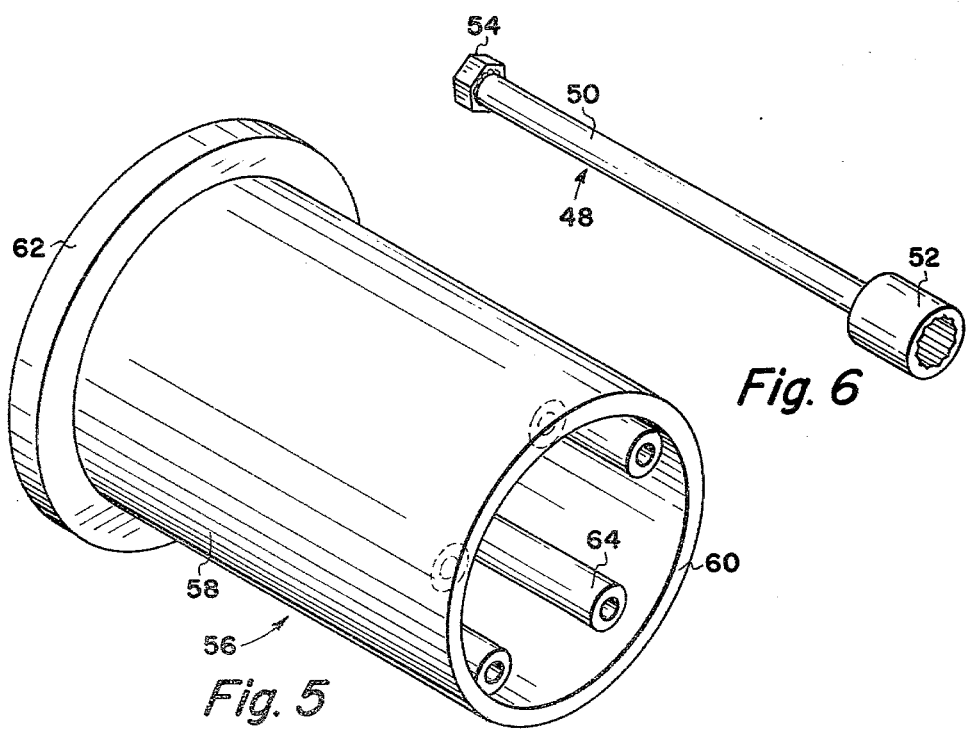
Fig. 5
Fig. 6

DUAL WHEEL ADAPTER KIT

BACKGROUND OF THE INVENTION

1. Field of the Invention

This invention relates to improvements in wheeled vehicles and more particularly but not by way of limitation, to an adapter kit for transforming the usual single wheel mounting of a vehicle into a dual wheel mounting.

2. Description of the Prior Art

Pick up trucks, and the like, are in widespread use today not only as commercial vehicles, but also as passenger or individually operated vehicles. The pick ups of a relatively heavy construction usually have somewhat strenuous work demands during operation thereof and are frequently built with a dual wheel arrangement at least at the rear wheel positions. Many of the pick ups are of a relatively light construction, however, and are normally provided with a single wheel at each corner of the vehicle. Of course, the light weight, single wheel models are usually considerably less expensive to buy, and as a consequence, the individually operated vehicles of this type are often of the single wheel variety. Owners of these vehicles have found that a dual wheel arrangement at the rear wheel positions has many advantages and greatly increases the overall unity of a vehicle. However, heretofore it has been quite expensive and difficult to alter the construction of the vehicle to achieve the dual wheel rear position therefor.

In order to solve this problem, a device to convert single rear wheels to dual wheels has been developed as shown in the J. C. Whitney & Company catalogs. This converter device, however has many disadvantages in that the second wheel must be installed inside out, and the threaded stems securing the second wheel to the vehicle tend to loosen with use, and the instructions provided with the device states that the wheel studs and nuts must be retightened after each one hundred miles of driving. In addition, if the original lug nuts are to be used in connection with the device, they must be put on backwards. The disadvantages of this converter device will be readily apparent.

SUMMARY OF THE INVENTION

The present invention contemplates a novel adapter for converting a single wheel installation to a dual wheel arrangement wherein the second wheel is mounted on the vehicle in substantially the exact manner as the mounting of the original equipment wheel, and the entire conversion operation may be accomplished in a very short period of time. The usual lug nuts of the single wheel are initially removed from the vehicle, leaving the usual lug bolts extending axially outwardly from the wheel mounting. An elongated nut having the inner periphery thereof threaded is secured to each of the exposed lug bolts in lieu of the original lug nuts, and an elongated threaded stem is secured to the outer end of the newly mounted nuts in substantially axial alignment with the respective lug bolts. The original lug bolts may then be threadedly secured onto the threaded stems and moved to a position of engagement with the outer ends of the elongated nuts, and securely tightened thereagainst thereby securing the original wheel in its original position in the same safe and secure manner as originally designed for the vehicle.

A sleeve having an outer diameter preferably substantially equal to the outer diameter of the vehicle axle and an inner diameter corresponding to the outer diameter of the central core of the outer face of the single wheel mounting is provided with a plurality of circumferentially spaced longitudinally extending tubes secured to the walls thereof, with an individual tube being provided for receiving each threaded stem therethrough. The sleeve is provided with one open end adapted to be disposed against the outer surface of the single wheel and in axial alignment with the vehicle axle, with each of the tubes receiving a threaded stud therethrough as the sleeve is positioned against the wheel. The opposite end of the sleeve is closed by a flanged disc member which is provided with a plurality of circumferentially spaced apertures arranged for receiving the outer end of each of the threaded stems through one of the apertures. The outer surface of the flanged disc member is provided with a centrally disposed axially extending boss member of a size and configuration generally corresponding with the central core member of the original wheel mounting thus providing a surface for receiving the second wheel, said surface being substantially identical with the mounting surface of the original equipment wheel. The second wheel may be positioned against the outer face of the flange disc in the well known manner of mounting wheels on a vehicle, and lug nuts of the usual or well known type may be threadedly secured to the outer ends of the threaded stems for securing the second wheel to the vehicle. The novel adapter kit is simple and efficient in operation and economical and durable in construction.

BRIEF DESCRIPTION OF THE DRAWINGS

FIG. 1 is an exploded perspective view of dual wheel adapter embodying the invention, and illustrating an installation procedure for converting a single wheel to a dual wheel.

FIG. 2 is an elevational view of a dual wheel installation embodying the invention.

FIG. 3 is an end elevational view of a dual wheel adapter embodying the invention.

FIG. 5 is a perspective view of a modified dual wheel adapter embodying the invention.

FIG. 6 is a perspective view of a locking wrench utilized with the dual wheel adapter embodying the invention.

DESCRIPTION OF THE PREFERRED EMBODIMENTS

Figure 4:
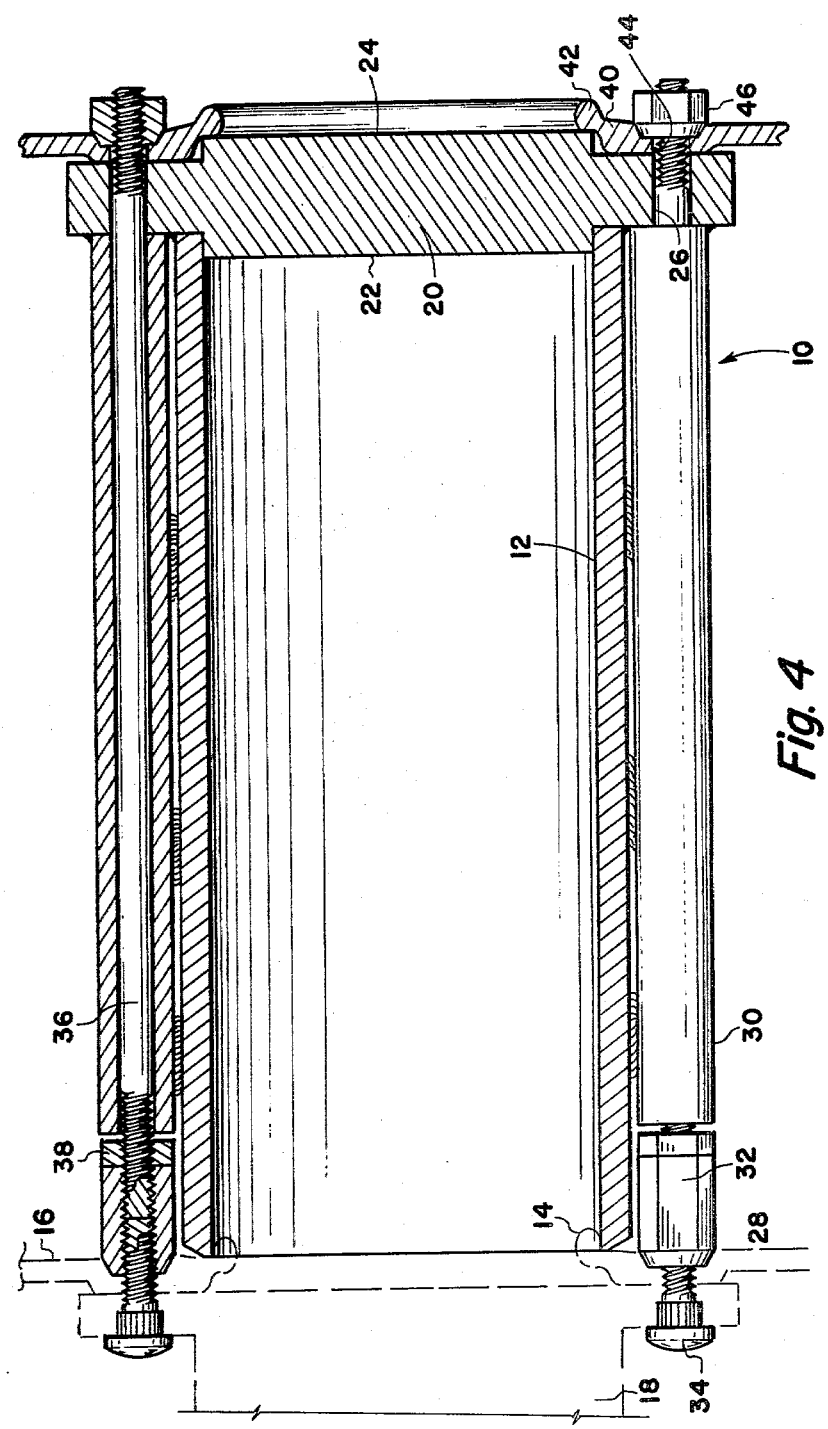
FIG. 4 is a view taken on line 4—4 of FIG. 3.

Referring to the drawings in detail, and particularly FIGS. 1 through 4, reference numeral 10 generally indicates a dual wheel adapter comprising a sleeve 12 preferably having an inner diameter substantially corresponding to the outer diameter of the usual central core or hub member 14 of a wheel 16, and an outer diameter substantially equal to the outer diameter of the usual wheel axle 18, but not limited thereto. One end of the sleeve 12 is open, as particularly shown in FIG. 4, for receiving the hub member 14 therein during installation of the device 10 in combination with the wheel 16, as will be hereinafter set forth. The opposite end of the sleeve 12 is closed by a disc member 20, which is welded or otherwise rigidly secured to the sleeve 12. The disc member 20 is provided with a first axially outwardly extending boss member 22 on the inwardly directed face thereof as viewed in FIG. 4 for insertion within the sleeve 12 for properly aligning the disc with respect to the sleeve 12. A second axially outwardly extending boss member 24 is provided on the outer face of the disc 20 and is of an outer diameter corresponding to the hub 14 for a purpose as will be hereinafter set forth. A plurality of circumferentially spaced bores 26 are provided in the disc 20 spaced radially outwardly from the bosses 22 and 24, and disposed in axial assignment with the usual bores 28 of the wheel 16 and axle 18 utilized in securing the wheel to the axle, as is well known.

A plurality of elongated tubes 30 are welded or otherwise rigidly secured to the outer periphery of the sleeve 12, with an individual tube 30 being provided for each of the bores 26. It is preferable that one end of each tube 30 be welded or otherwise secured to the disc 20 in the proximity of the respective bore 26, as shown in FIG. 4, and each tube 30 extends from the disc 20 in a direction toward the open end of the sleeve 12, but terminates at a distance spaced inboard from said open end for a purpose as will be hereinafter set forth.

An elongated nut member 32 having the inner periphery thereof threaded is provided for threaded connection with each of the usual lug bolts 34 utilized with the wheel 16, and is of a length sufficiently great as to extend beyond the outer limit of each lug bolt when fully engaged therewith. An elongated threaded rod 36 is provided for threaded engagement with the open outer end of each nut 32, and is sufficiently long as to extend through the respective tube 30 and beyond the disc 20 for a purpose as will be hereinafter set forth. It is preferable that the outer periphery of each stem 36 be threaded throughout its entire length, but the stems 36 are shown herein as being threaded only on the outer ends thereof for purposes of illustration. The usual lug nut 38, or any other suitable nut, is threadedly secured to each rod 36 and disposed adjacent the outer end of the respective nut 32 and are tightened securely against the nuts 32 prior to insertion of the rods 36 through the tubes 30.

A second wheel 40, preferably of the same type as the wheel 16, may be disposed adajcent the outer face of the disc 20 with the box 24 disposed in the hub portion 42 thereon in the usual or well known manner normally utilized for installing a wheel on a vehicle (not shown). The lug bores 44 of the wheel 40 are disposed in alignment with the bores 26 for receiving the outer ends of the rod 36 therethrough, and suitable lug bolts 46 of any well known type may be threadedly secured to the projecting outer ends of the stems 36 and tightened thereagainst in the well known manner for safely securing the wheel 40 to the disc 20. In this manner, the first wheel 16 becomes a companion to the second wheel 40 to provide a dual wheel assembly for the vehicle.

In order to install the device 10 and wheel 40 on the usual single wheel 16 of a suitable vehicle (not shown) and as illustrated in FIG. 1, the usual lug nuts 38 of the original installation of the wheel 16 are removed in the usual manner, leaving the outer ends of the lug bolts 34 projecting outwardly from the wheel 16. The elongated nuts 32 are threadedly engaged with the lug bolts 34, and tightened securely thereagainst in the usual or well known manner. A threaded rod 36 is secured to the outer open end of each nut 32, and the original lug nut 38, or any other suitable similar nut is threadedly secured to the rod 36 and positioned adjacent the nut 32, as particularly shown in FIG. 4. The lug nuts 38 are securely tightened against the nut 32 for securing the wheel 16 onto the axle 18 in the manner as originally installed, thus providing a safe installation for the wheel 16 when using the device 10 in combination therewith.

A special wrench or tool generally indicated at 48 in FIG. 6 is provided for tightening of the lug bolts 38. The tool 48 comprises a sleeve 50 preferably of a length somewhat greater than the length of the rods 36, but not limited thereto, and having an inner diameter greater than the outer diameter of the rods 36 for readily receiving the rods therethrough. A suitable wrench head 52 is rigidly secured to one end of the sleeve 50 in any suitable manner, and is of an internal configuration complementary to the configuration of the outer periphery of the lug nut 38 for engaging the lug nuts for tightening thereof during rotation of the sleeve 50 about its own longitudinal axis. It is also preferable to provide a head member 54 secured to the opposite end of the sleeve 50 for facilitating the application of torque to the sleeve 50 through the use of the usual or normal lug wrench (not shown) during tightening of the nuts 38, or unthreading thereof upon removal of the device 10.

When the lug nuts 38 have been properly tightened against the nuts 32, the sleeve 12 is disposed against the outer surface of the wheel 16 by telescoping the tubes 30 over the respective rods 36 until the open end of the sleeve 12 is disposed around the hub member 14 of the wheel 16. In this manner, the rods 36 are extended through the bores 26, and the wheel 40 may be positioned against the outer surface of the disc 20 in the same manner as the original installation of the wheel 16, and the lug nuts 46 may be threadedly engaged with the extending ends of the rods 36 and securely tightened therewith in any well known manner, such as by the use of the usual lug wrench (not shown) or the like. It is important to note that the inner diameter of the tubes 30 is only slightly larger that the outer diameter of the threaded rods 36 whereby there is relatively little clearance therebetween. This provides for a stability between the adapter 10 and the wheel 16 for a strong and safe structure. In this manner the wheel 16, which is a single wheel installation as originally provided on the vehicle, now cooperates with the wheel 40 to provide a dual wheel assembly for the vehicle. Of course, the process may be reversed for removal of the second wheel if desired.

In some instances, the original wheel 16 of a vehicle (not shown) may be of a relatively large diameter, and the use of the sleeve 12 having the tubes 30 spaced outboard of the outer periphery thereof may become impractical. In this event, an adapter generally indicated at 56 in FIG. 5 may be utilized. The adapter 56 comprises a sleeve 58 having an inner diameter slightly greater than the diameter defined by the outer limits of the bolt holes of the wheel. One end 60 of the sleeve 58 is open for disposition against the outer surface of the wheel (not shown) in a manner generally similar as hereinbefore set forth, and the opposite end is closed by a disc member 62 generally similar to the disc member 20. However, the circumferentially spaced apertures or bores (not shown) of the disc 62 are disposed radially inboard of the walls of the sleeve 58, and, of course, in alignment with the bolt holes (not shown) of the wheel with which the adapter 56 is to be utilized. A plurality of rods 64 generally similar to the rods 30 are welded or otherwise rigidly secured to the inner periphery of the sleeve 58 and extend from the respective bore (not shown) of the disc 62 in a direction toward the open end 60 of the sleeve 58 in the same manner and for the same purpose as the rods 30. The adapter 56 may be installed in the same manner as hereinbefore set forth for converting a single wheel installation to a dual wheel installation.

From the foregoing it will be apparent that the present invention provides a novel adapter kit for converting a single wheel installation on a vehicle to a dual wheel installation. The novel device comprises a sleeve adapted to be secured to the original wheel for effectively extending the length of the vehicle axle in an outboard direction, and having tube members cooperating with threaded rods for extending the length of the usual lug bolts whereby the second wheel may be secured to the outer end of the sleeve in the same general manner as the installation of the original wheel on the vehicle. The novel device provides a strong, efficient connection for the second wheel, and the entire conversion operation may be accomplished in a relatively short period of time.

Whereas the present invention has been described in particular relation to the drawings attached hereto, it should be understood that other and further modifications, apart from those shown or suggested herein may be made within the spirit and scope of this invention.

What is claimed is:

1. An adapter kit for converting a single wheel installation of a vehicle to a dual wheel installation and comprising sleeve means removably securable to the wheel and extending outwardly therefrom in substantial alignment with the vehicle axle, tube means secured to the wall of the sleeve and in substantial axial alignment with the vehicle lug bolts, elongated nut means removably secured to the vehicle lug bolts, threaded rod means removably securable with said elongated nut means and extending through the tube means and beyond the outer end of the sleeve means, locking nut means threadedly secured to said rod means and engagable with the outer end of said elongated nut means for securely locking the rod means in position, flanged disc means provided on the outer end of the sleeve means for closing thereof and for receiving the outer ends of the rod means therethrough whereby a second wheel may be secured against the outer face of the flanged disc means, lug nut means engagable with the outer ends of the rod means for securing the second wheel to the flanged disc means, and wherein the sleeve means is provided with an inner diameter substantially equal to the outer diameter of the hub of the vehicle wheel for facilitating alignment of the sleeve means therewith and hub means of a size complementary to the hub of the second wheel is provided on the outer face of said flanged disc means for facilitating securing of the second wheel thereto.

2. An adapter kit as set forth in claim 1 wherein the inner diameter of the tube means is relatively close to the outer diameter of the threaded rod means for maintaining a minimum clearance therebetween for stability of converted dual wheel installation.

3. An adapter kit as set forth in claim 1 wherein the flanged disc means is provided with a plurality of circumferentially spaced bores in alignment with the lug bolts for receiving the threaded rods therethrough.

4. An adapter kit as set forth in claim 3 wherein said tube means comprises a tube secured to the wall of the sleeve in alignment with each of the bores of the flanged disc and extend from the flange disc in a direction toward the lug nuts for receiving the threaded rod means therethrough.

5. An adapter kit as set forth in claim 4 wherein the tubes are rigidly secured to the outer periphery of the sleeve.

* * * * *